Feb. 7, 1950 — F. C. STEINHAUER — 2,496,964
CONTAINER PARTITIONING DEVICE
Filed June 11, 1947 — 2 Sheets-Sheet 1

INVENTOR.
FRANK C. STEINHAUER
ATTORNEY

Feb. 7, 1950 — F. C. STEINHAUER — 2,496,964
CONTAINER PARTITIONING DEVICE
Filed June 11, 1947 — 2 Sheets-Sheet 2

INVENTOR.
FRANK C. STEINHAUER
BY 
ATTORNEY

Patented Feb. 7, 1950

2,496,964

UNITED STATES PATENT OFFICE 2,496,964

CONTAINER PARTITIONING DEVICE

Frank C. Steinhauer, Decatur, Ga.

Application June 11, 1947, Serial No. 753,844

2 Claims. (Cl. 220—22)

This invention relates to a container partitioning device for use with various types of vessels, such as cooking utensils and the like, and is designed to separate the space within the vessel into a plurality of compartments.

An object of my invention is to provide a container partitioning device which is simple in construction, efficient in operation and easy to clean.

Another object of my invention is to provide a container partitioning device which is cheap and easy to manufacture.

Another object of my invention is to provide a partitioning device for use in vessels having constricted openings.

Another object of my invention is to provide a partitioning device which may be used in a vessel having either a constricted opening or a vessel having an opening which is not constricted.

Another object of my invention is to provide a three or a four compartment container partitioning device which is comprised of only two separable parts.

A further object of my invention is to provide a partitioning device which may be assembled inside a vessel having a constricted opening.

With the above and numerous other objects in view as will appear as the description proceeds, the invention resides in certain novel features of construction, and in the combination and arrangement of parts as will be hereinafter more fully described and claimed.

Figure 1:
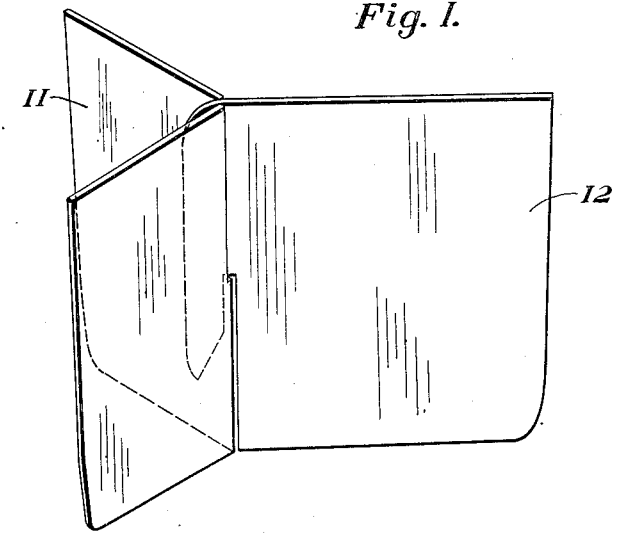
Fig. 1 is a prospective view of the three compartment container partitioning device.

According to my invention, the three compartment partitioning device shown in Fig. 1, is comprised of two sheet members or plates 11 and 12. The plate 11 has a slot 13 approximately midway between its ends, and said slot extends downwardly from the upper edge of the plate 11 approximately to the center of said plate. The width of the slot 13 is the same or slightly greater than the thickness of the plate 12. The plate 11 is bent so that the ends thereof diverge from the slot 13 at an angle of approximately 120 degrees.

Plate 12 is provided at one end with a downwardly turned, overhanging lip portion 14 which is undercut by slot 15 which extends approximately half-way up from the bottom of plate 12. The overhanging lip portion 14 terminates at a point 16 which lies in a plane approximately 1/3 of the distance from the bottom of the plate 13 to the top of the slot 15. The width of the slot 15 at the top thereof is the same or slightly greater than the thickness of the plate 11, and the lip portion 14 is so shaped that this width of the slot 15 is maintained for a length approximately 1/3 of the distance from the top of the slot to the bottom of the plate 12; thereafter, the lip portion is tapered to the point 16 so as to form a divergent or flaring wall for the slot 15.

Plate 12 is fastened to plate 11 by being inserted into slot 13 and moved downwardly so that plate 11 is held in slot 15, as shown in Fig. 1.

Figure 2:
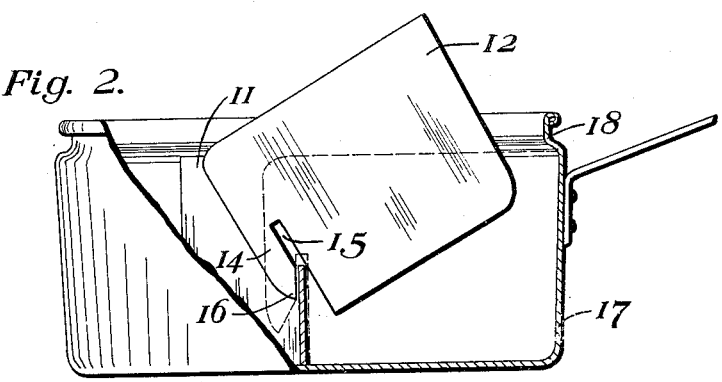
Fig. 2 shows the three compartment partitioning device being placed in a cooking utensil with constricted top opening.
Figures 3, 4:
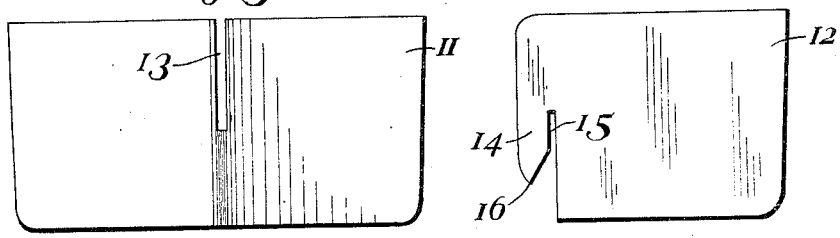
Fig. 3 is an elevation of the bottom section of a three compartment container partitioning device.
Fig. 4 is an elevation of the top section of a three compartment container partitioning device.

The flaring portion of slot 15 provided by the tapered end of lip portion 14 enables my partitioning device to be used in vessels such as the utensil 17, shown in Fig. 2, in which the opening is constricted as shown at 18. The plate 11 is first placed in position in the vessel, and the plate 12 is then inserted at an angle, as shown in Fig. 2, and swung down into the position of use wherein it fits snugly against the side of the vessel, as shown in broken lines in this figure of the drawings.

It is understood, of course, that the number and arrangement of the plates 11 and 12 may be modified to divide the container into a different number of compartments of the same or different volumetric content. For example, plate 11 can be used alone, if desired; or plate 11 may be bent so that it ends diverge at an angle other than 120 degrees or plate 11 may be flat; or the slot 13 need not be placed approximately midway between the ends of plate 11; and the width of plate 12 can be varied to fit various combinations and arrangements.

Figure 5:
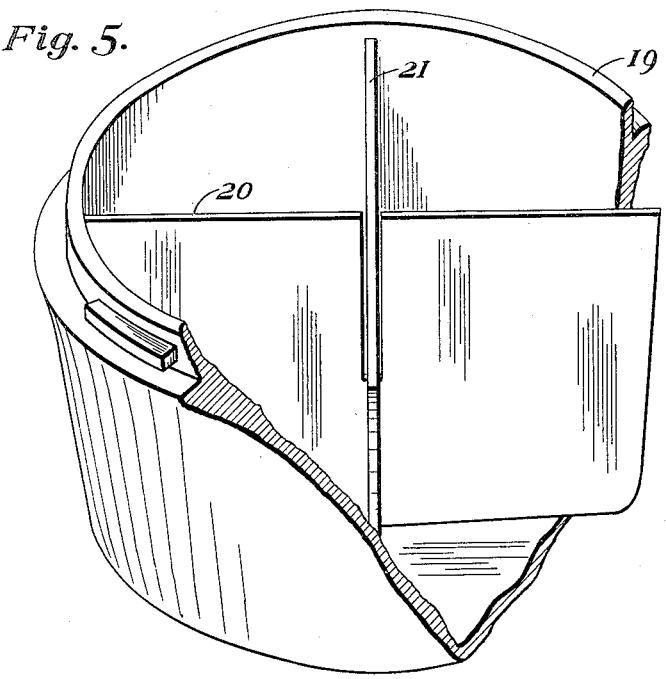
Fig. 5 is a perspective view, partially in section, showing a four compartment partitioning device in a vessel.
Figure 6:
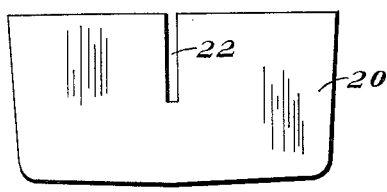
Fig. 6 is an elevation of the bottom section of a four compartment container partitioning device.
Figure 7:
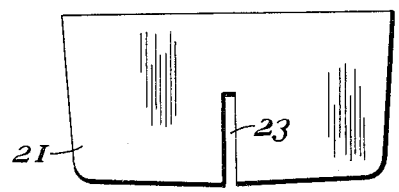
Fig. 7 is an elevation of the top section of a four compartment container partitioning device.
Figure 7:
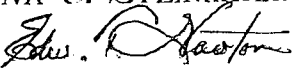

Fig. 5 shows a four compartment partitioning device in a pressure cooker 19. According to my invention, the four compartment partitioning device is comprised of two sheet members or plates 20 and 21. The plate member 20 is constructed similarly to the plate member 11 in the three compartment partitioning device except that it is flat and not bent as is the plate 11. The plate 20 has a slot 22 approximately midway between its ends, and said slot extends downwardly from the upper edge of the plate 20 approximately to the center of said plate. The width of the slot 22 is the same or slightly greater than the thickness of plate 21.

Plate 21 is provided with a slot 23 approximately midway between its ends, and said slot extends upwardly from the bottom edge of the plate 21 approximately to the center of said plate. The width of the slot 23 is the same or slightly greater than the thickness of plate 20.

The slots 22 and 23 are so arranged in respect to the plates 20 and 21 that the unslotted portion of plate 21 will fit snugly into the slot 22 to its full height, and the unslotted portion of the plate 20 will fit snugly into slot 23 to its full height. As a result, the intermeshed assembly of the plates will have the same height as either plate individually.

As shown, both of the plates 20 and 21 are of the same height and contour, being particularly adapted to the interior contour of the cooker 19, and both slots 22 and 23 are along the center lines of the plates 20 and 21, respectively. If desired, however, depending upon the shape of the container and governed by the character of the subcompartments to be obtained, the contour of the plates 20 and 21 may differ from each other and the slots 22 and 23 may be placed at other positions than along the center lines.

It will be evident from the foregoing that the partitioning device of the present invention may be readily shipped and stored in knocked down condition, in which condition it will occupy but little space. At any time when the partitioning devices are needed they can be readily assembled in a minimum of time and without use of any tools whatsoever.

According to my invention, the top and bottom edges, as well as the sides of the partitioning plates conform to the contours of the container with which they are to be utilized so that each subcompartment is snugly closed along all walls thereof.

It is obvious that many modifications might be made, and it is therefore intended that the scope of my invention be limited only by the scope of the appended claims.

I claim:

1. A partitioning device, to be utilized in connection with a receptacle having a constricted opening, comprising a plurality of cooperating plates, one of said plates having a slot extending downwardly from its upper edge, said plate being bent along the axis of said slot so that the ends of the plate diverge therefrom at an angle of approximately 120 degrees, another of said plates having an overhanging lip portion extending downwardly from its upper edge but terminating short of the bottom edge of the plate of which it is a part and forming a slot between the inner edge thereof and the adjacent edge of the remainder of said plate, the said adjacent edge being straight, the inner edge of said lip portion being substantially parallel with said adjacent edge near the upper end of the slot formed thereby and diverging from said adjacent edge near the open lower end of said slot whereby said slot is made wider at its open lower end and permits the plates to be assembled at an angle to each other and then interlocked in place inside the receptacle with which they are utilized.

2. A partitioning device, to be utilized in connection with a receptacle having a constricted opening, comprising a plurality of cooperating plates, one of said plates having a slot extending downwardly from its upper edges, another of said plates having an overhanging lip portion extending downwardly from its upper edge but terminating short of the bottom edge of the plate of which it is a part and forming a slot between the inner edge thereof and the adjacent edge of the remainder of said plate, the said adjacent edge being straight, the inner edge of said lip portion being substantially parallel with said adjacent edge near the upper end of the slot formed thereby and diverging from said adjacent edge near the open lower end of said slot whereby said slot is made wider at its open lower end and permits the plates to be assembled at an angle to each other and then interlocked in place inside the receptacle with which they are utilized.

FRANK C. STEINHAUER.

REFERENCES CITED

The following references are of record in the file of this patent:

UNITED STATES PATENTS

| Number | Name | Date |
|---|---|---|
| 348,839 | Grosz | Sept. 7, 1886 |
| 1,538,106 | Gaylord | May 19, 1925 |
| 1,754,812 | Zacharias | Apr. 15, 1930 |
| 1,791,889 | Duncan | Feb. 10, 1931 |
| 2,016,488 | Eckhaus | Oct. 8, 1935 |